(12) United States Patent
Kim

(10) Patent No.: US 7,577,466 B2
(45) Date of Patent: Aug. 18, 2009

(54) PORTABLE DEVICE INCLUDING DISPLAY UNIT AND KEYPAD UNIT

(75) Inventor: Jun Gi Kim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 595 days.

(21) Appl. No.: 11/476,311

(22) Filed: Jun. 27, 2006

(65) Prior Publication Data
US 2007/0142092 A1   Jun. 21, 2007

(30) Foreign Application Priority Data
Dec. 21, 2005   (KR) .................. 10-2005-0127391

(51) Int. Cl.
*H04M 1/00* (2006.01)
(52) U.S. Cl. ............... 455/575.4; 455/575.1; 455/90.3; 455/566; 379/433.01; 379/433.04; 379/433.07; 379/433.1; 379/433.11; 379/433.12
(58) Field of Classification Search ............. 455/575.1, 455/575.3, 575.4, 90.3, 566, 347–349; 379/433.01, 379/433.04, 433.07, 433.1, 433.11, 433.12, 379/433.13
See application file for complete search history.

(56) References Cited
U.S. PATENT DOCUMENTS

| | | | | |
|---|---|---|---|---|
| 7,110,797 B2* | 9/2006 | Soejima | .................... | 455/575.1 |
| 7,130,669 B2* | 10/2006 | Moon | ....................... | 455/575.3 |
| 7,187,958 B2* | 3/2007 | Nishijima et al. | ......... | 455/575.3 |
| 7,200,429 B2* | 4/2007 | Park et al. | ................. | 455/575.4 |
| 7,269,450 B2* | 9/2007 | Lee et al. | .................. | 455/575.1 |
| 7,336,979 B2* | 2/2008 | Soejima | ................... | 455/575.1 |
| 7,369,882 B2* | 5/2008 | Hwang et al. | ............ | 455/575.1 |
| 7,419,099 B2* | 9/2008 | Lee et al. | ............... | 235/472.01 |
| 7,492,893 B2* | 2/2009 | Ahn et al. | .............. | 379/433.13 |
| 2004/0203537 A1* | 10/2004 | Yoshida et al. | ............. | 455/90.3 |

* cited by examiner

*Primary Examiner*—Tuan A Tran
(74) *Attorney, Agent, or Firm*—H.C. Park & Associates, PLC

(57) ABSTRACT

A portable device embodying both sliding and rotating types is described. The portable device including: a main unit; a display unit sliding and horizontally rotating on a top surface of the main unit, and having a display on its top surface; and a keypad unit sliding in an opposite direction from the display unit and horizontally rotating on a bottom surface of the main unit and having an additional keypad which is provided on its top surface and externally exposed after rotating. Also, the portable device may be transformed into various operating modes by sliding and/or rotating of the display unit and the keypad unit, which are suitable for phone calling, game play and multimedia replay.

6 Claims, 8 Drawing Sheets

PORTABLE DEVICE INCLUDING DISPLAY UNIT AND KEYPAD UNIT

CROSS-REFERENCE TO RELATED APPLICATION

This application claims the benefit of Republic of Korea Patent Application No. 10-2005-127391, filed on Dec. 21, 2005, in the Korean Intellectual Property Office, the disclosure of which is incorporated herein by reference.

BACKGROUND OF THE INVENTION

1. Field of the Invention

The present invention relates to a portable device, and more particularly, to a portable device of a sliding and rotating type.

2. Description of Related Art

Mobile terminals can be generally classified as a flip type, a folder type, and a sliding type according to their appearance or operational method. In this instance, a mobile terminal of the sliding type overlaps two sliding bodies with each other and provides a display portion and a key input portion, on opposing sliding bodies, facing the same direction. Generally, a mobile terminal of the sliding type can expose the display portion or the key input portion, which is concealed by the top portion, by comparatively moving the top sliding body. As an example, a mobile terminal of the sliding type can expose a key input portion provided on a rear sliding body by upwardly sliding a front sliding body.

Currently, because of developments in communication technology and increased memory capacity, users can enjoy watching movies and playing various types games via portable devices. Accordingly, mobile terminals having a general function of making a call and also having functions of playing a game and replaying multimedia, and having various structures for embodying the functions are being researched and developed.

FIG. 1 is a perspective view illustrating a mobile terminal of a conventional sliding type.

Referring to FIG. 1, a mobile terminal 1 of the conventional sliding type includes an upper sliding body 20 and a lower sliding body 10 which are overlapped with each other in upper and lower portions. A sliding hinge portion is provided between the upper and lower sliding bodies 20 and 10, and connects the same. Also, the sliding hinge portion may help the upper and lower sliding bodies 20 and 10 to easily slide. A display portion 25, a game button portion 26 and a game navigation key portion 28 are provided on a top surface of the upper sliding body 20. A key input portion (not shown) is provided on a top surface of the lower sliding body 10.

However, in the mobile terminal of the conventional sliding type, the display portion 25, the game button portion 26 and the game navigation key portion 28 are all provided on the top surface of the upper sliding body 20 to enable a user to enjoy game functions. Accordingly, an area for the display portion 25 becomes exceedingly narrow, which causes a user to easily suffer from eyestrain when playing a game for an extended period. Also, in this case, the user may not enjoy the game vividly.

Also, while users want to secure a wider keypad space or an additional key button to readily utilize various types of game functions of a mobile terminal, the mobile terminal of the conventional sliding type may not provide a space for a new key button. Also, the mobile terminal may not be able to provide a new keypad which is suitable for game functions.

Also, in the case of the conventional mobile terminal, when a user wants to make a call or utilize a function of watching a move or playing a game among general functions of the mobile terminal, transformation of the conventional mobile terminal to be suitable for each function may not be easy or may be impossible.

SUMMARY OF THE INVENTION

The present invention provides a portable device which can easily be transformed to be suitable for its various types of functions, and help a user to readily utilize the functions such as making a call, replaying multimedia and playing a game.

The present invention also provides a portable device which can secure a wider keypad space or have a larger area for a key pad than the conventional portable device, and help a user to readily utilize various types of game functions added to the portable device.

The present invention also provides a portable device which can provides a display wider than the conventional portable device, reduces user's eyestrain during watching a movie or playing a game via the portable device, and enables the user to enjoy the game much vividly According to an aspect of the present invention, there is provided a portable device including a main unit, a display unit and a keypad unit, wherein the display unit is provided on a top surface of the main unit and the keypad unit is provided on a bottom surface of the main unit. In this instance, a first complex hinge part is provided between the main unit and the display unit and a second complex hinge part is provided between the main unit and the keypad unit. Namely, the display unit provided on the top surface of the main unit is physically connected to the main unit via the first complex hinge part. The keypad unit provided on the bottom surface of the main unit is physically connected to the main unit via the second complex hinge part.

The display unit may slide and horizontally rotate on the top surface of the main unit by the first complex hinge part, and the keypad unit may slide in an opposite direction from the display unit and horizontally rotate on the bottom surface of the main unit by the second complex hinge part.

According to another aspect of the present invention, a main keypad may be placed on the top surface of the main unit to enable a user to input a number or a character. In this instance, the main keypad may be selectively exposed by sliding and rotating the display unit.

According to still another aspect of the present invention, a top surface of the display unit may be externally exposed and a display is installed on the top surface of the display unit. A user may verify an inputted number or character and also enjoy a game and a movie via the display. Also, menu keys may be provided on the top surface of the display unit, which are adjacent to the display. In this instance, a user may input a simple instruction using the menu key, such as making a call, and starting and terminating a movie.

A top surface of the keypad unit may be selectively exposed by sliding and rotating the keypad unit and an additional keypad may be installed on the top surface of the keypad unit. Generally, the additional keypad may be provided for use with the game function of the portable device.

Accordingly, a portable device according to an aspect of the present invention may be structurally transformed to be suitable for each function, such as making a call, enjoying multimedia and playing a game. Accordingly, a user may utilize the each function more readily and actively. Also, the portable device may provide a keypad space larger than the conventional portable device. Accordingly, a user may more readily utilize various types of functions added to the portable device. Also, the portable device may provide a display area larger than the conventional portable device. Accordingly, a user may suffer less eyestrain when watching a movie or playing a game via the portable device.

A portable device as used in the present specification includes mobile communication devices, such as a Personal Digital Cellular (PDC) phone, a personal communication service (PCS) phone, a personal handyphone system (PHS) phone, a Code Division Multiple Access (CDMA)-2000 (1X, 3X) phone, a Wideband CDMA phone, a dual band/dual mode phone, a Global Standard for Mobile Communications (GSM) phone, a mobile broadband system (MBS) phone, a Digital Multimedia Broadcasting (DMB) phone, and a cellular phone; portable terminals such as a personal digital assistant (PDA), a hand-held PC, a notebook PC, a wireless broadband Internet (WiBro) terminal, and an MP3 player; and all types of hand-held based wireless communication devices including an International Mobile Telecommunication (IMT)-2000 providing international roaming service and extended mobile communication service. Also, the portable device may include a predetermined communication module such as a CDMA module, a Bluetooth module, an Infrared Data Association (IrDA) module, a wired/wireless LAN card and a wireless communication device which is provided with a global positioning system (GPS) chip enabling tracking of a position via a GPS. Also, the portable device may include a microprocessor which can play multimedia and perform a certain calculation operation.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
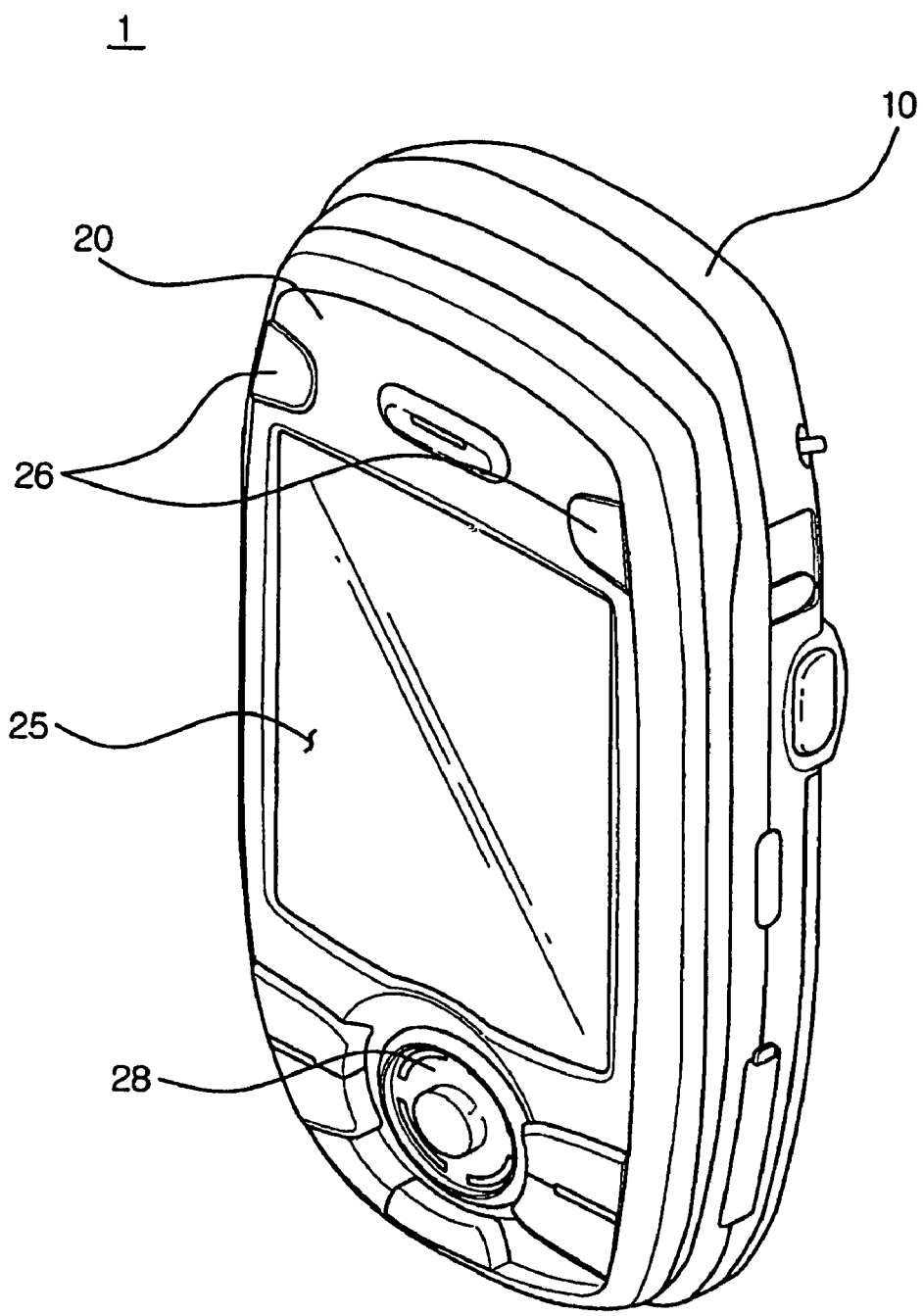
FIG. 1 is a perspective view illustrating a mobile terminal of a conventional sliding type.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
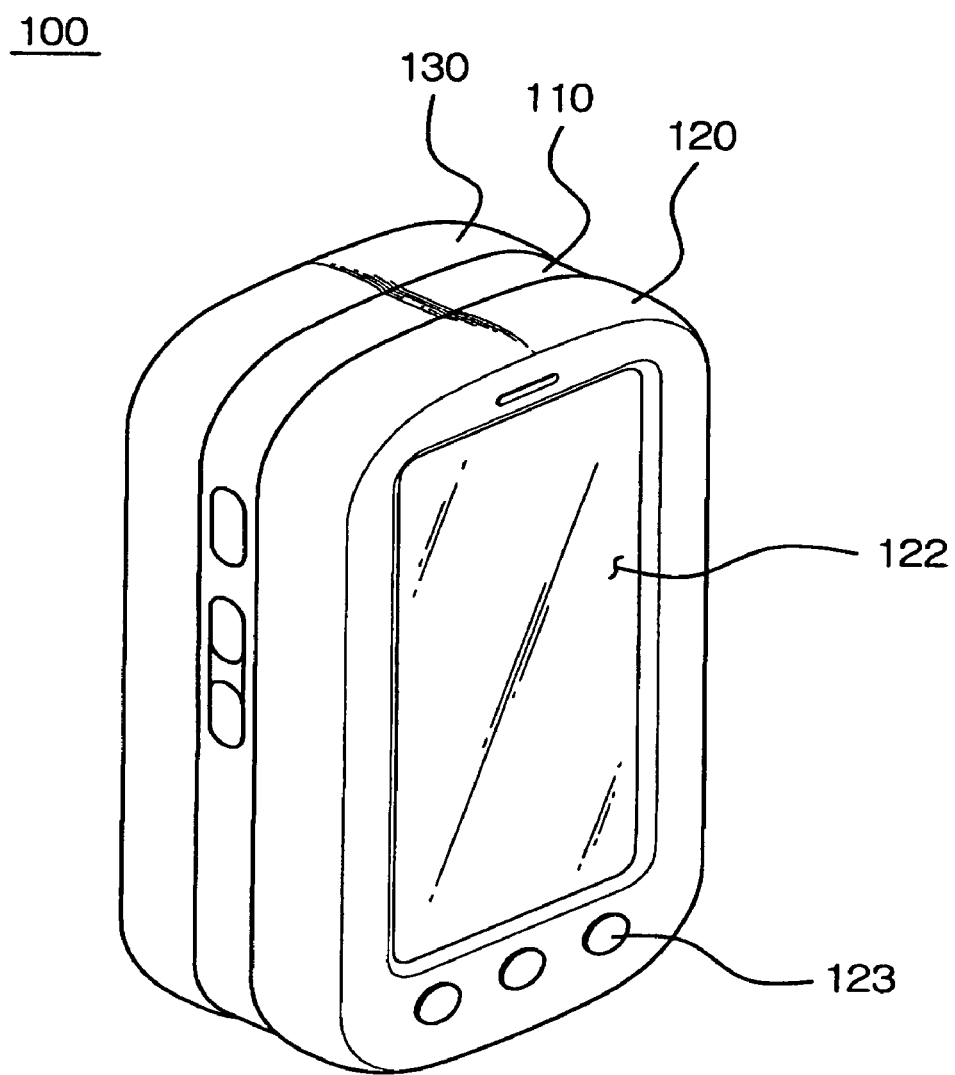
FIGS. 2 through 6 are perspective views illustrating a portable device according to an embodiment of the present invention.

FIG. 2 is a perspective view illustrating a portable device according to an embodiment of the present invention.

Referring to FIG. 2, a portable device 100 of the present invention includes a main unit 110, a display unit 120 and a keypad unit 130.

Figure 7:
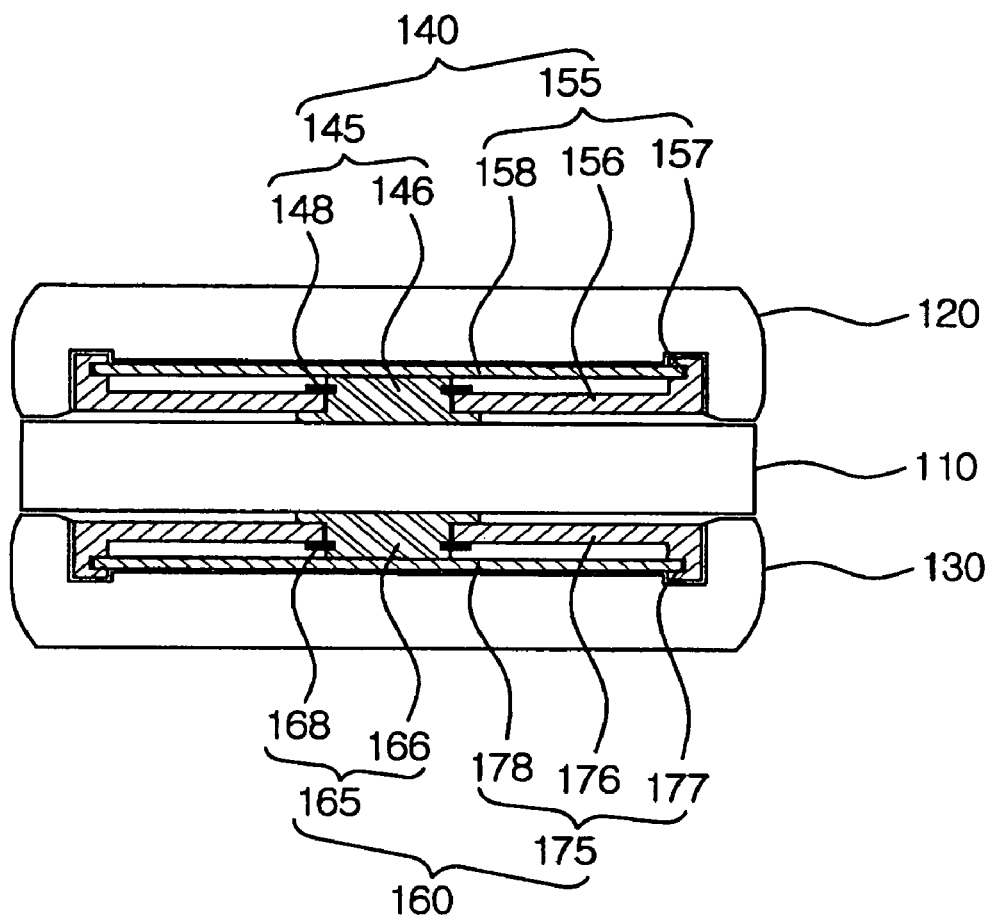
FIG. 7 is a cross-sectional view illustrating a portable device according to an embodiment of the present invention.

The display unit 120 is provided on a top surface of the main unit 110. The keypad unit 130 is provided on a bottom surface of the main unit 110. First and second complex hinge parts 140 and 160 of FIG. 7 are provided between the main unit 110 and the display unit 120, and between the main unit 110 and the keypad unit 130, respectively. In this instance, the display unit 120 provided on the top surface of the main unit 110 is physically connected to the main unit 110 via the first complex hinge part 140. The keypad unit 130 provided on the bottom surface of the main unit 110 is physically connected to the main unit 110 via the second complex hinge part 160.

Also, the display unit 120 slides and horizontally rotates on the top surface of the main unit 110 via the first complex hinge part 140. The keypad unit 130 slides in an opposite direction from the display unit 120 and horizontally rotates on the bottom surface of the main unit 110 via the second complex hinge part 160.

Figure 3:
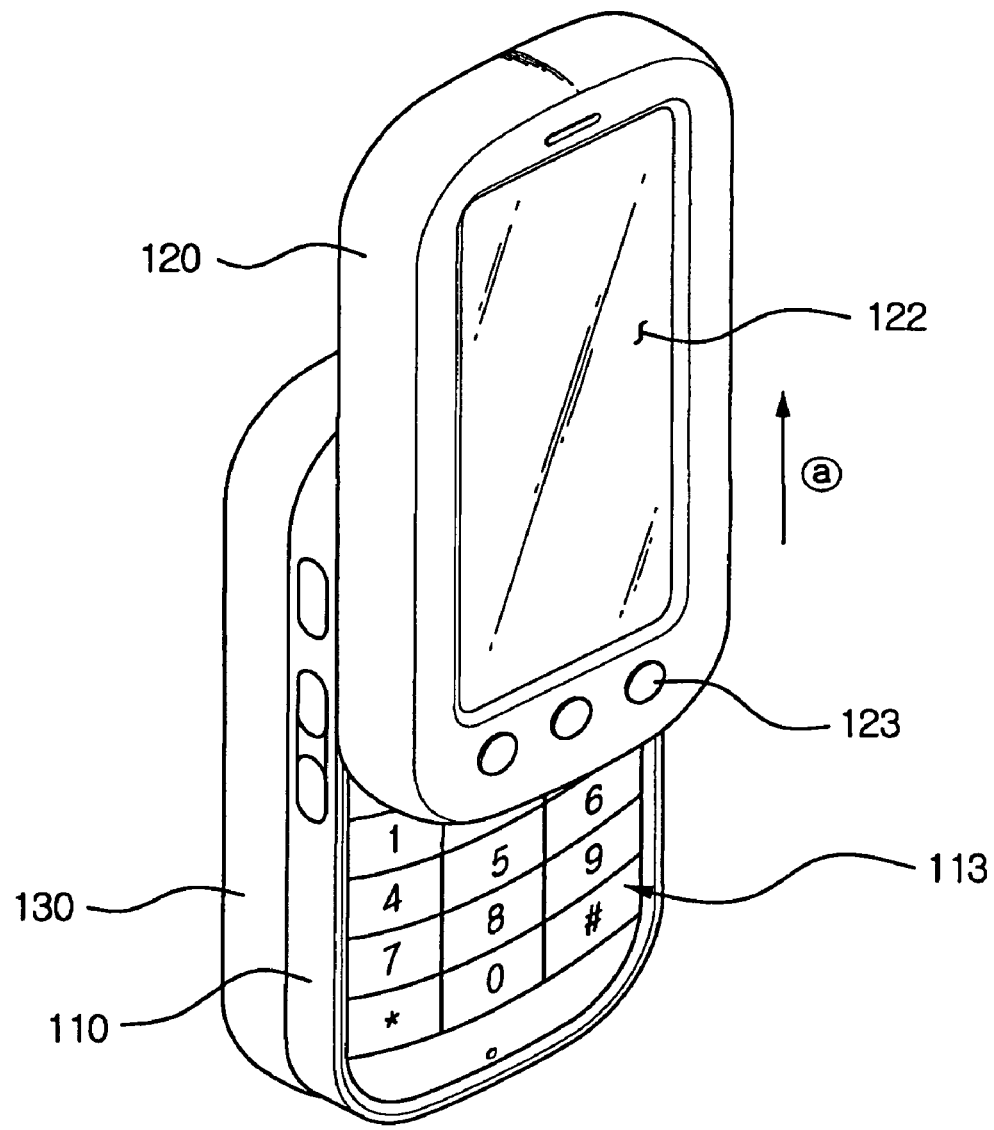

A main keypad 113 of FIG. 3 is installed on the top surface of the main unit 110 and enables a user to input a number or a character. Also, the main keypad 113 may be selectively exposed by sliding the display unit 120.

A top surface of the display unit 120 is externally exposed at all times and a display 122 is installed on the top surface of the display unit 120. A user may verify an inputted number or character and also enjoy a game and a movie via the display 122. Also, menu keys 123 may be provided on the top surface of the display unit 120, which are adjacent to the display 122. In this instance, a user may input a simple instruction using the menu keys 123, such as making a call, and starting and terminating a movie.

Figure 5:
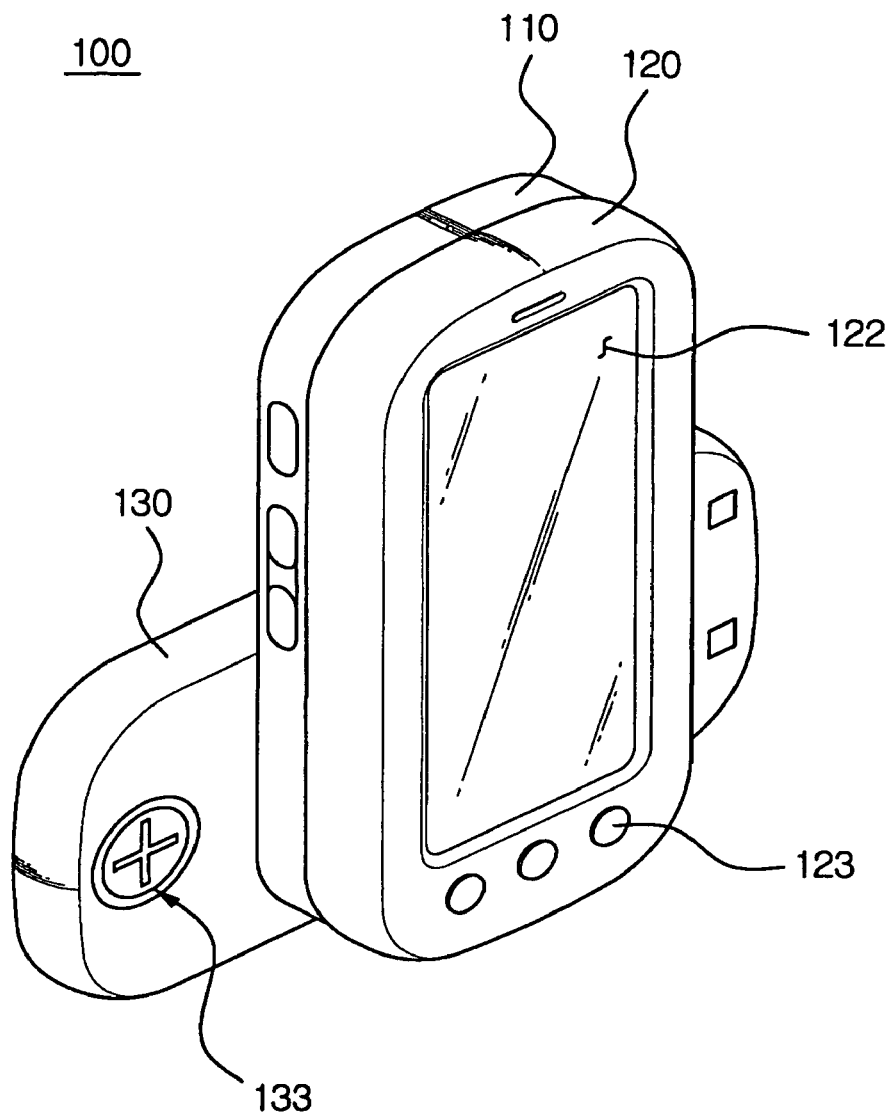

A top surface of the keypad unit 130 is selectively exposed by sliding and rotating the keypad unit 130 and an additional keypad 133 shown in FIG. 5 is installed on the top surface of the keypad unit 130. Generally, the additional keypad 133 is provided for use with the game function of the portable device 100.

FIG. 3 is a perspective view illustrating the portable device of FIG. 2, in which the display unit slides upwardly.

Referring to FIG. 3, the portable device 100 includes the main unit 110, the display unit 120 and the keypad unit 130. The display unit 120 slides upwardly in a direction on the top surface of the main unit 110.

When the display unit 120 slides from the main unit 110, the main keypad 113 provided on the top surface of the main unit 110 is externally exposed. In this case, a keypad may be arranged to enable a user to easily make a call or input a number and character.

Figure 4:
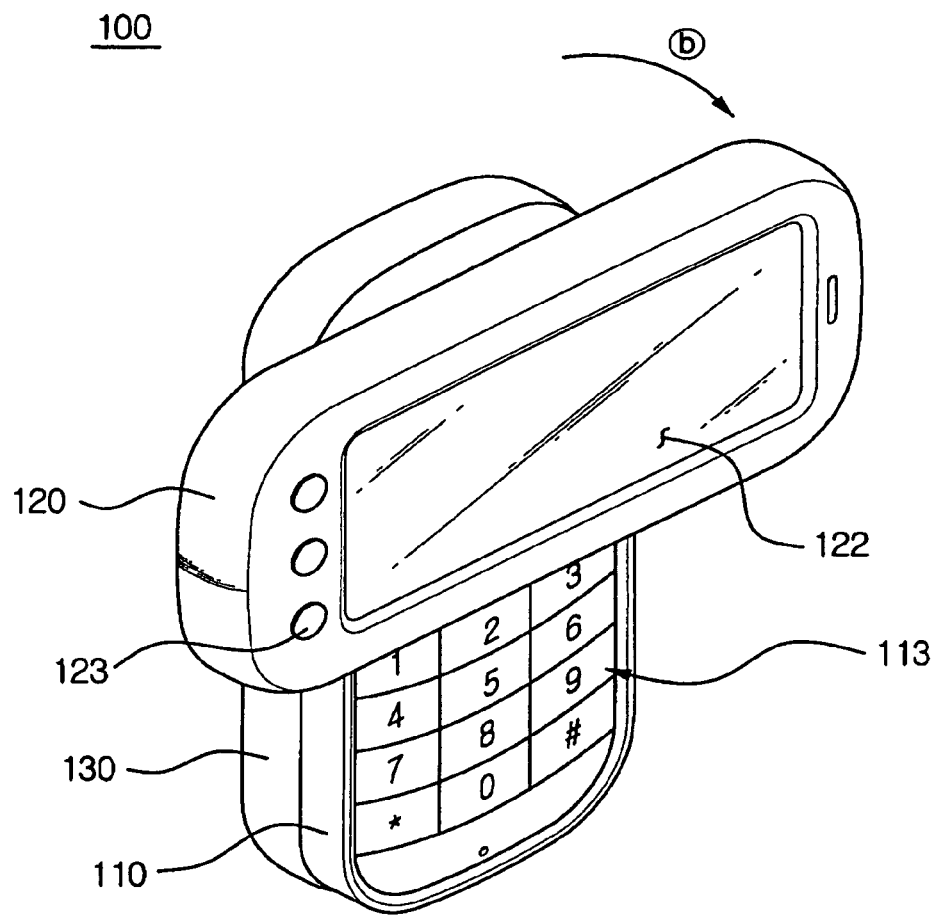

FIG. 4 is a perspective view illustrating the portable device of FIG. 3, in which the display unit rotates at the upper position of the main unit.

Referring to FIG. 4, the portable device 100 includes the main unit 110, the display unit 120 and the keypad unit 130. The display unit 120 initially slides upwardly and subsequently rotates clockwise or counterclockwise on the top surface of the main unit 110. Generally, the display unit 120 is capable of rotating about 90 degrees to each of a clockwise or counterclockwise direction from its initial position.

In this case, the display 122 is provided to be horizontal, which will be very convenient when utilizing digital multimedia (DMB) and multimedia from among various types of functions of the portable device 100.

FIG. 5 is a perspective view illustrating the portable device of FIG. 2, in which the keypad unit rotates at the lower position of the main unit.

Referring to FIG. 5, the keypad unit 130 initially downwardly slides and subsequently rotates clockwise or counterclockwise on the bottom surface of the main unit 110. In this instance, a user may select to rotate the keypad unit 130 in a clockwise direction or counterclockwise direction. Generally, the keypad unit 130 is capable of rotating about 90 degrees to each of a clockwise or counterclockwise direction from its initial position.

When the keypad unit 130 slides from the main unit 110 and rotates, the additional keypad 133 provided on the top surface of the keypad unit 130 is externally exposed to enable a user easily play a game.

Figure 6:
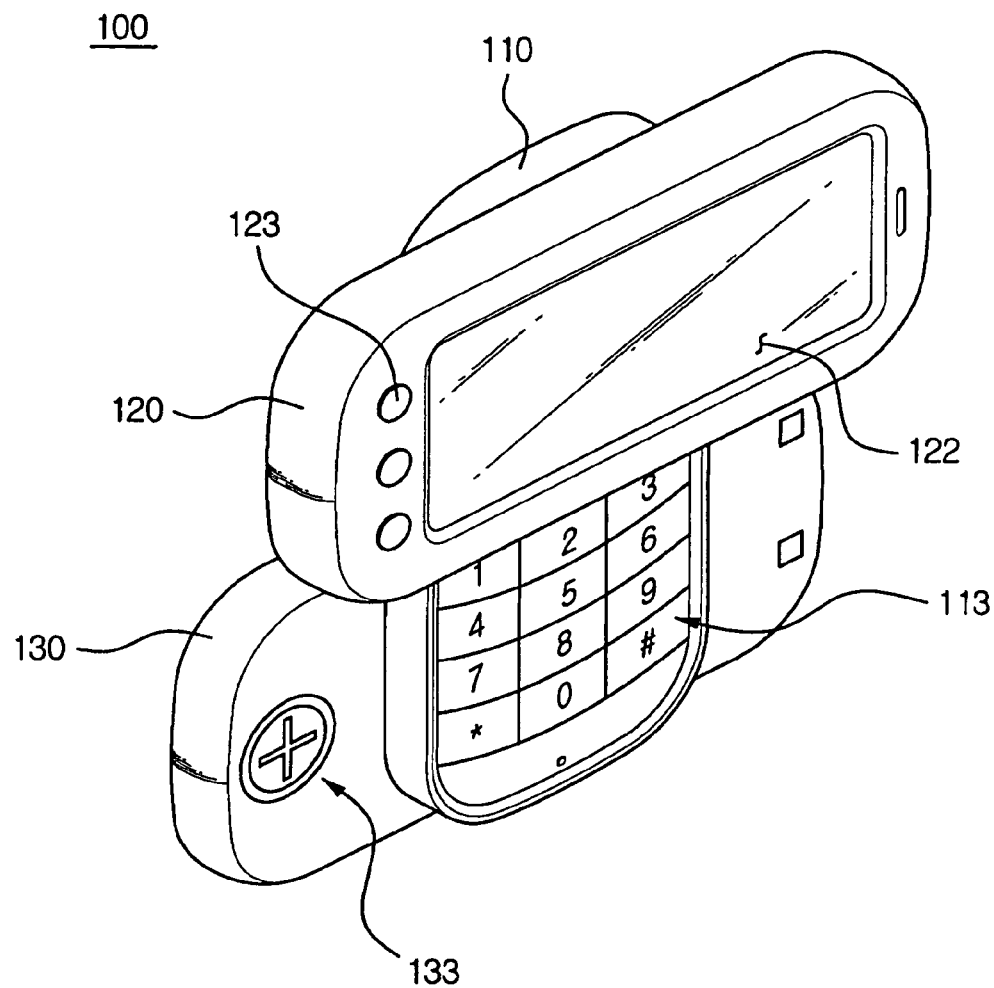

FIG. 6 is a perspective view illustrating the portable device of FIG. 2, in which the display unit and the keypad unit all slide and rotate.

Referring to FIG. 6, the display unit 120 initially upwardly slides and subsequently rotates on the top surface of the main unit 110, and the keypad unit 130 initially downwardly slides and subsequently rotates on the bottom surface of the main unit 110.

Also in this case, the additional keypad 133 provided on the top surface of the keypad unit 130 is externally exposed to enable a user to easily play a game.

Figure 8:
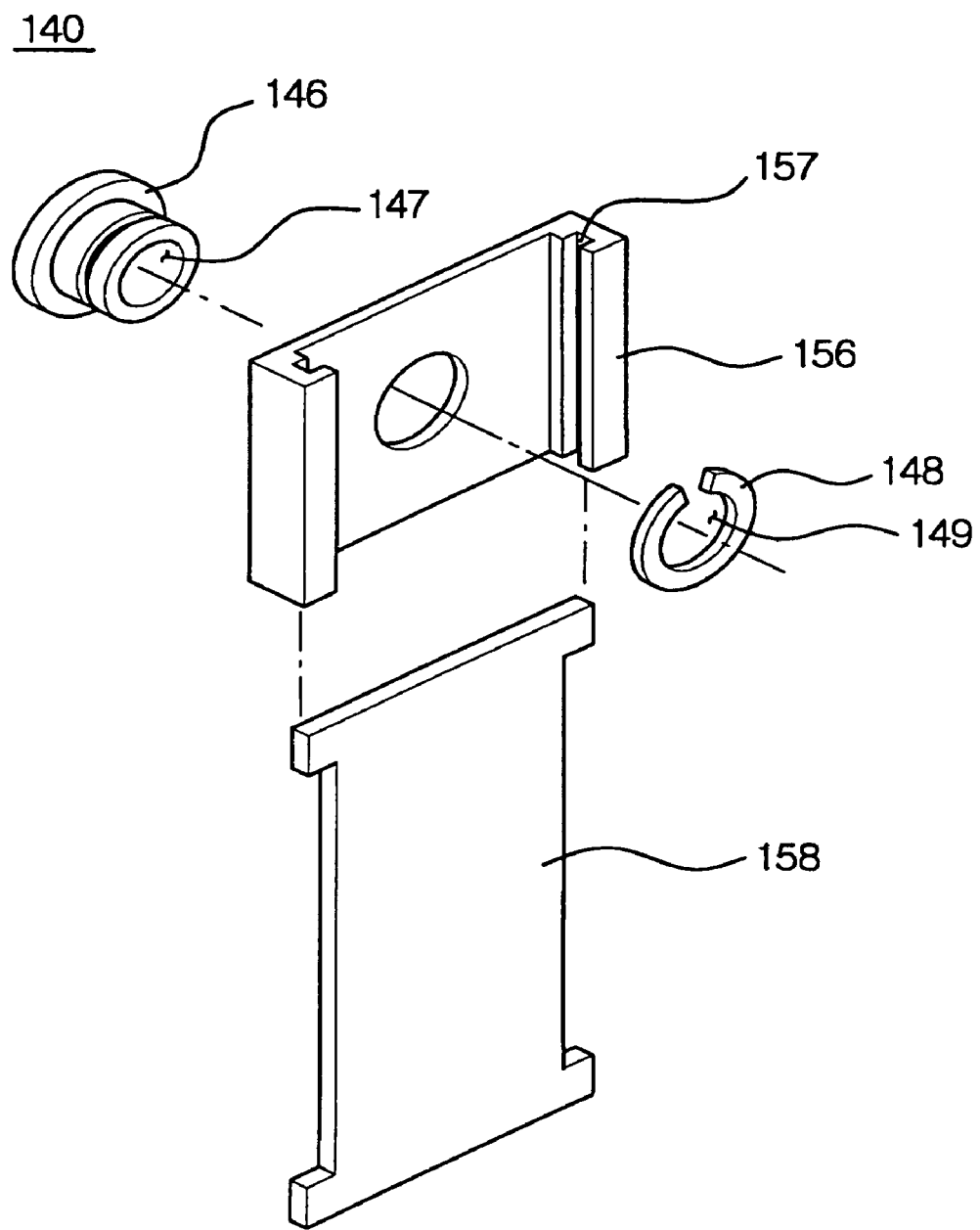
FIG. 8 is an exploded perspective view illustrating a first complex hinge part according to an embodiment of the present invention.

FIG. 7 is a cross-sectional view illustrating the portable device of FIG. 1, and FIG. 8 is an exploded perspective view illustrating the first complex hinge part of FIG. 7.

Referring to FIGS. 7 and 8, the portable device 100 includes the main unit 110, the display unit 120 and the keypad unit 130. In this instance, the display unit 120 is provided on the top surface of the main unit 110 and the keypad unit 130 is provided on the bottom surface of the main unit 110.

The first complex hinge part 140 is provided between the main unit 110 and the display unit 120. Also, the second complex hinge part 160 is provided between the main unit 110 and the keypad unit 130.

The display unit 120 provided on the top surface of the main unit 110 is physically connected to the main unit 110 via the first complex hinge part 140. The keypad unit 130 provided on the bottom surface of the main unit 110 is physically connected to the main unit 110 via the second complex hinge part 140.

Also, the display unit 120 slides and horizontally rotates on the top surface of the main unit 110 via the first complex hinge part 140. The keypad unit 130 slides on the bottom surface of the main unit 110 and horizontally rotates in an opposite direction from the display unit 120 via the second complex hinge part 160.

The first complex hinge part 140 provided between the main unit 110 and the display unit 120 includes a first rotation hinge section 145 and a first sliding hinge section 155.

Specifically, the first rotation hinge section 145 includes a first lower rotation hinge 146 and a first upper rotation hinge 148. In this instance, the first lower rotation hinge 146 is installed on the main unit 110 and has a first lower hole 147. The first upper rotation hinge 148 is rotatable on the first lower rotation hinge 146 and has a first upper hole 149 corresponding to the first lower hole 147.

The first sliding hinge section 155 includes a first sliding guide 156 installed on the first rotation hinge section 145 and a first rail plate 158 installed on the display unit 120. A first groove 157 is formed on the first sliding guide 156 and receives both ends of the first rail plate 158. Accordingly, the first sliding guide 156 slides along the first groove 157.

The second complex hinge part 160 provided between the main unit 110 and the keypad unit 130 includes a second rotation hinge section 165 and a second sliding hinge section 175.

Specifically, the second rotation hinge section 165 includes a second lower rotation hinge 166 and a second upper rotation hinge 168. In this instance, the second rotation hinge 166 is installed on the main unit 110 and has a second lower hole. The second upper rotation hinge 168 is rotatable on the second lower rotation hinge 166 and has a second upper hole corresponding to the second lower hole.

The second sliding hinge section 175 includes a second sliding guide 176 installed on the second rotation hinge section 165 and a second rail plate 178 installed on the keypad unit 130. A second groove 177 is formed on the second sliding guide 176 and receives both ends of the second rail plate 178. Accordingly, the second sliding guide 176 slides along the second groove 177.

The main unit 110 and the display unit 120 may be electrically connected to each other by a flexible printed circuit board passing through the first lower hole 147 and the first upper hole 149. Also, the main unit 110 and the keypad unit 130 may be electrically connected to each other by a flexible printed circuit board passing through the second lower hole and the second upper hole.

A portable device according to the present invention may be structurally transformed to be suitable for making a call, replaying multimedia and playing a game. Accordingly, a user may be capable of enjoying the functions readily and animatedly.

Also, a portable device according to the present invention may provide a wider display than in the conventional portable device and reduces a user's eyestrain when playing a game and watching a movie via the portable device and also enable the user to utilize more animated game service.

Also, a portable device according to the present invention provides three types of keypads. Accordingly, disadvantages in manipulating game buttons and navigation keys in the conventional art due to their small size are solved. Also, since various types of functions are added to the portable device, additional keys and buttons may be easily provided.

Also, a portable device according to the present invention embodies both sliding and rotation types. Accordingly, a user may be able to utilize various types and not be bored.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A portable device comprising:
   a main unit;
   a display unit sliding and horizontally rotating on a top surface of the main unit, and having a display on its top surface; and
   a keypad unit sliding in an opposite direction from the display unit and horizontally rotating on a bottom surface of the main unit and having an additional keypad which is provided on its top surface and externally exposed after rotating.

2. The device of claim 1, wherein:
   a first complex hinge part is provided between the main unit and the display unit, and includes a first rotation hinge section installed on the top of the main unit and a first sliding hinge section installed on the first rotation hinge section, the first rotation hinge section has a hole, and the first sliding hinge section has a first sliding guide installed on the first rotation hinge section and a first rail plate installed on the display unit to slide along the first sliding guide, and
   a second complex hinge part is provided between the main unit and the keypad unit, and includes a second rotation hinge section installed on the bottom of the main unit and a second sliding hinge section installed on the second rotation hinge section, the second rotation hinge section has a hole, and the second sliding hinge section has a second sliding guide installed on the second rotation hinge section and a second rail plate installed on the display unit to slide along the first sliding guide.

3. The device of claim 2, wherein:

the first sliding guide has a groove receiving both ends of the first rail plate, and the second sliding guide has a groove receiving both ends of the second rail plate.

4. The device of claim 2, wherein:

the first rotation hinge section includes a first lower rotation hinge installed on the top of the main unit with a first lower hole and a first upper rotation hinge rotatable on the first lower rotation hinge with a first upper hole corresponding to the first lower hole, and the second rotation hinge section includes a second lower rotation hinge installed on the bottom of the main unit with a second lower hole and a second upper rotation hinge rotatable on the second lower rotation hinge with a second upper hole corresponding to the second lower hole.

5. The device of claim 1, wherein a main keypad is provided on the top surface of the main unit.

6. The device of claim 1, wherein a menu key is provided on the top surface of the display unit.

* * * * *

UNITED STATES PATENT AND TRADEMARK OFFICE
CERTIFICATE OF CORRECTION

PATENT NO. : 7,577,466 B2
APPLICATION NO. : 11/476311
DATED : August 18, 2009
INVENTOR(S) : Jun Gi Kim Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 647 days.

Signed and Sealed this

Seventh Day of September, 2010

David J. Kappos
*Director of the United States Patent and Trademark Office*